United States Patent [19]

Tauszig

[11] 4,032,930
[45] June 28, 1977

[54] MECHANISM FOR THE APPLICATION AND REMOVAL OF A STYLUS WIRE ON STENCIL MATERIAL TO BE ENGRAVED

[76] Inventor: Julio G. Tauszig, Grecia 4020, Buenos Aires, Argentina

[22] Filed: Sept. 9, 1975

[21] Appl. No.: 611,820

[30] Foreign Application Priority Data

Sept. 23, 1974 Argentina .......................... 255690

[52] U.S. Cl. ........................... 346/163; 346/139 C; 346/165
[51] Int. Cl.² ............... G03G 15/044; G03G 17/00
[58] Field of Search .......... 346/165, 153, 162, 163, 346/164, 155, 154, 139 A, 74.1, 139 C; 179/100.41 G

[56] References Cited

UNITED STATES PATENTS

| | | | |
|---|---|---|---|
| 2,591,138 | 4/1952 | Cooley | 346/74 S |
| 2,741,960 | 4/1956 | Oldenboom | 346/74 ES |
| 2,766,097 | 10/1956 | Zabriskie | 346/74 E |
| 3,115,382 | 12/1963 | Morse | 346/139 C |
| 3,434,159 | 3/1969 | Erdman | 346/139 C |

Primary Examiner—Jay P. Lucas
Attorney, Agent, or Firm—Peter S. Lucyshyn

[57] ABSTRACT

In a stencil cutting device having a stylus for burning information from an original document into stencil material mounted for relative movement with respect thereto, apparatus for moving the stylus toward and away from the material includes an electromagnet having first and second pole pieces joined together to provide a predeterminedly shaped junction. The electromagnet has a curved surface and a blade-like support of magnetic material mounted for pivotal movement at a first end with the stylus attached thereto at the opposite end, and overlying the curved surface of the electromagnet normally in spaced relation therewith. Upon energization of the electromagnet, the support is drawn into engagement with the curved surface of the joined pole pieces to move the stylus into contact with the stencil material. The support is spaced slightly from the electromagnet at the free end thereof to provide a dampening effect for the stylus.

6 Claims, 3 Drawing Figures

U.S. Patent June 28, 1977 4,032,930
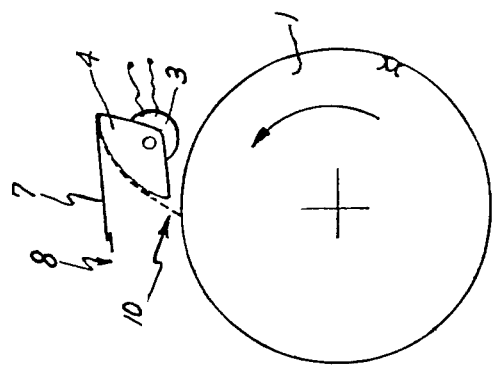
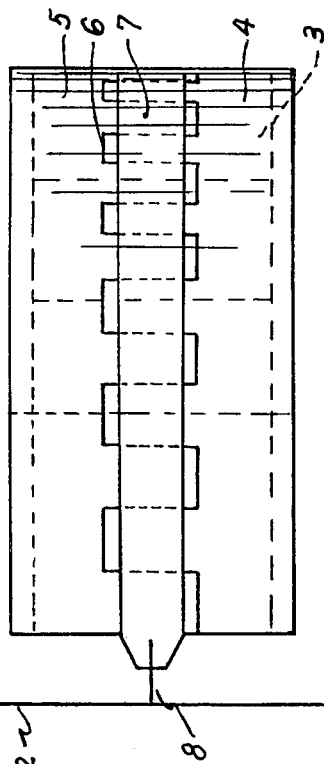
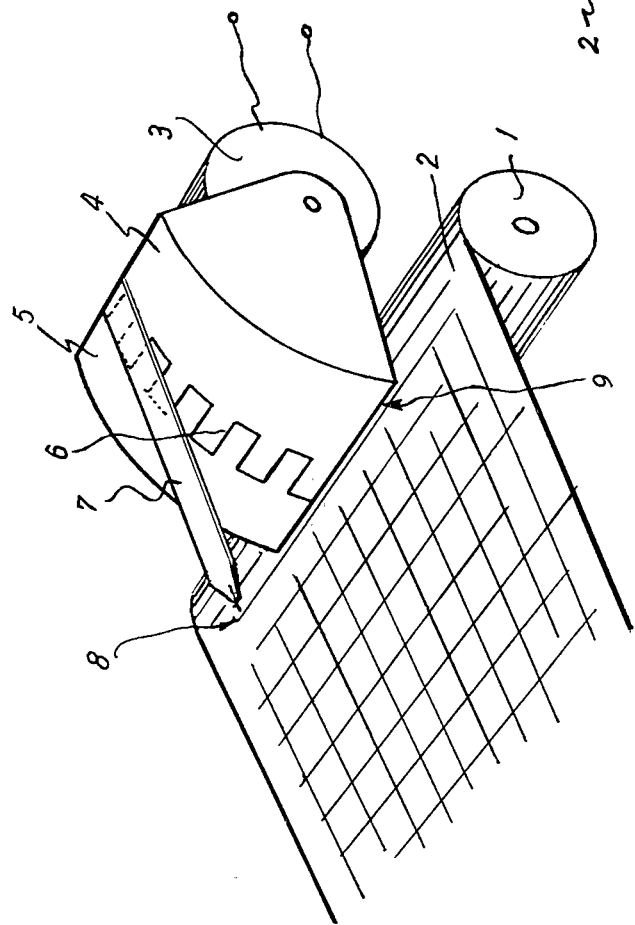

MECHANISM FOR THE APPLICATION AND REMOVAL OF A STYLUS WIRE ON STENCIL MATERIAL TO BE ENGRAVED

BACKGROUND OF THE INVENTION

The present invention refers to a mechanism for the application and lifting of the recording or engraving wire or stylus on the sensitive material to be engraved as employed in a "stencil" engraving machine for offset or for a single copy.

SUMMARY OF THE INVENTION

The main object of the present invention is to provide in a stencil engraving machine, a mechanical arrangement for applying and lifting the stylus which makes possible a greater engraving speed for which purpose it can be applied to cylinders which carry stencil material and rotate at high speed or to surfaces which are displaced at high speed, there being thus obtained a better quality stencil than that obtained with slower machines which are in the public domain.

Another object of the present invention is to provide a mechanism operated electromagnetically of the specified type, at low cost, which contains a smaller number of movable parts and consequently which requires less maintenance than arrangements known today.

Still another object of the present invention, which is especially important, is that of obtaining a mechanism of the specified type which will be described in more detail below, with which there is obtained an appreciable lessening of the undesirable oscillations of the stylus caused by present arrangements.

These and other purposes and advantages derived from them, shall be seen in the course of the present description.

A known stylus mounting arrangement, consists of a coil with its respective nucleus, which operates a set of levers by means of which there is changed the position of the support of the engraving wire or stylus which, when resting on the surface of the material to be engraved, bends under the effects of pressure. The most serious problem presented by that arrangement is the vibration and the shocks which are produced when the wire passes through the zone of union of the material on the cylinder, the oscillations of which cause rebounds or jerks which alter the quality of the image reproduced. The force of the resting action of the stylus is conditioned by the elasticity of the plate which constitutes the stylus support. To try to eliminate that hindering effect, recourse is taken in incorporating at the free end of the support an element which has a distinct oscillation frequency, which consists in a loose rivet which plays freely in the slit made in the support. In that way, the oscillation frequency difference between the plate and the rivet dampens the oscillations through the energy dissipation produced by the interference between oscillations.

To obtain a good dampening, it is necessary to place relatively heavy rivets, which consequently require engraving wires more rigid and of greater diameter, which takes away from the preciseness of the engraving.

With the system of the present invention, there is obtained a laminated wire support with an inertia on the order of five times less than the conventional one. It requires no rivet to dampen the oscillations since that effect is produced through transference of the energy of the mechanical motion to the electric circuit, where it becomes dissipated by means of the magnetic field.

In turn, the small plate of the support is not what produces the resting force, but on the contrary, the force is produced by the magnetic attraction of the system, which results in the plate being twice as thin, thus reducing its mass. In that manner, the resting force or force applied to the stencil is more constant. The arrangement also for the same reason, compensates for the variations in length which might affect the engraving point as a result of wear.

The lesser inertia of the system makes it possible to use much finer stylus wires than those used in the known devices, thus improving the quality of the reproduction, and in turn making it possible to increase the speed of engraving.

DESCRIPTION OF THE DRAWING

In order for the present invention to be clearly understood and easily executed, in its basic idea, there will be given below a precise description of one form of execution, reference being made in same to the attached drawing, the whole with the character of a purely illustrative, and not limitative example of the invention. In the drawing:

FIG. 1 is a perspective view of the stylus support apparatus according to the invention with the wire or stylus raised;

FIG. 2 is a lateral schematic view of the electromagnetic mechanism for the control of the position of the engraving wire, executed according to the principles of the present invention, the working position is represented in broken lines; and FIG. 3 consists of a partial top view of the apparatus according to the present invention, which makes clearer other details of construction thereof.

DETAILED DESCRIPTION OF THE DRAWING

In the figures, the same reference markings indicate equal or corresponding parts.

In essence, and in the particular case illustrated in the figures, the invention being described is constituted by the carrying device 1 for the material 2 to be engraved. In this case it can be a graphorecorder, as well as an echo sound, for example. The material to be engraved or recorded may consist of an electrosensitive paper under the action of an electric arc, which may be available in the form of a flat surface or on a cylinder or rotating drum as illustrated in FIG. 2.

The apparatus is composed of an electromagnet with its coil 3 and two pole parts 4 and 5 separated by a zig-zag or greek-pattern type of interface 6. The pole parts take on a semi-cylindrical shape.

On one edge of those polar yokes there is fixed the blade-like support 7 of magnetic material at the free end of which there is affixed the engraving or stylus wire 8, which is projected over a reduced distance on the order of two millimeters. Edge 9 of poles 4 and 5 is placed at a short distance from the surface to be engraved.

When coil 3 of the electromagnet becomes energized, there is formed a magnetic field which becomes exteriorized at the interface by an alternating succession of North and South poles, to which the magnetic material of the support responds, the latter being attracted toward the poles and consequently drawing the wire or stylus against the surface to be engraved.

The arrangement of coil 3 and the dimensions of the device maintain the end of the support slightly distant, see broken line 10 in FIG. 2, which is a most important factor in the dampening of the stylus. The arrangement of the coil which is referred to can be seen in broken lines in FIG. 3.

The functional relationship has already been explained in detail in the course of the explanation. From what has been presented, it can be seen that the apparatus consists of an electromagnet with two pole parts facing each other and shaped in a manner such that the interface is slightly in zig-zag and presents a curved surface, herein a semi-cylindrical area, at one edge of which there is affixed the flexible blade-like support of the wire. The support is made of magnetic material and in functional position lays on the pole parts and overhangs the edge thereof to project slightly toward the carrying surface of the material to be engraved on which the point of said wire or stylus rests. The length of the support and the magnetic field of the electromagnet conditioned by the position of the coil are defined such that the extreme free end portion of said blade-like support remains slightly distant from the polar surfaces.

It is logical to assume that when applied, the present invention can undergo modifications with respect to some details of construction and of shape of the mechanism, without for as much leaving the fundamental principles clearly specified in the claims which are attached at the end of the description.

In the explanation as well as in the illustrative drawings, there has been represented an interface in the form of teeth (greek key type), this because it is the arrangement which provides the greatest sensitivy for the device, as well as the less energy consumed, there is reduced the magnetizing current. Another case of application may use the zig-zag arrangement, that is to say the alternate angular shape, less sensitive than the preceding one and requiring a greater consumption of energy. A rectilinear interface parallel with the blade-like support would represent the less favorable case. Undoubtedly, any one (type) can serve, as can other shapes, only the sensitivity depends on the development of said interface.

What I claim is:

1. Apparatus for the application and removal of the engraving stylus of a stencil cutter toward and away from sensitive stencil material to be engraved including in combination: an electromagnet having a curved surface, a blade-like support of magnetic material fixed at one end thereof to bend thereabout, the support normally overlying the curved surface of said electromagnet in spaced relation with respect thereto, the free end of the support extending beyond the end of the electromagnet and said stylus used for applying stencil cutting pulses to the stencil material being attached to the free end of said support, said support being drawn into engagement with the curved surface of said electromagnet and bending substantially into conformity with the curved surface upon the energization of the latter, so that said stylus is positioned in contacting engagement with said stencil material positioned adjacent said electromagnet, the free end of said support remaining slightly spaced from said electromagnet to provide a dampening effect to said stylus as the latter passes over said stencil material.

2. Apparatus as claimed in claim 1 wherein said electromagnet comprises two pole pieces engaging each other along a predetermined junction to provide an external magnetic field thereat and wherein said support overlies said junction.

3. Apparatus as claimed in claim 2 wherein said pole pieces are formed with tooth-like edges for interlocking engagement along the junction thereof.

4. Apparatus as claimed in claim 3 wherein the electromagnet has a semi-cylindrical shape with a coil captured between the pole pieces thereof.

5. Apparatus as claimed in claim 4 wherein the first edges of said pole pieces includes rectangularly shaped teeth, the teeth of said first pole piece interlocking with the teeth of said second pole piece to form said junction.

6. In a stencil cutting device having a stylus for burning information from an original document into stencil material mounted for relative movement with respect thereto, in contact with the stylus, apparatus for the application and removal of the stylus toward and away from said stencil material, said apparatus including in combination:

an electromagnet having first and second pole pieces joined together at first edges thereof to provide a predeterminedly shaped junction, a coil positioned between said pole pieces, the surface of said electromagnet being curved along the junction thereof and a bendable blade-like support of magnetic material being affixed at one end thereof to bend thereabout, the support normally overlying the curved surface of said electromagnet along said junction in spaced relation therewith, the free end of said support overlying the end of said electromagnet, said stylus being attached to the free end of said support, said support being drawn into engagement with the curved surface of said electromagnet to bend substantially into conformity with the curved surface upon energization of said coil, so that said stylus is moved into contacting engagement with said stencil material, the free end of said support remaining spaced slightly from said electromagnet to provide a dampening effect to said stylus as the latter passes over said stencil material.

* * * * *